United States Patent
Wyles

(10) Patent No.: US 9,251,162 B2
(45) Date of Patent: *Feb. 2, 2016

(54) SECURE STORAGE MANAGEMENT SYSTEM AND METHOD

(71) Applicant: FLEXERA SOFTWARE LLC, Schaumburg, IL (US)

(72) Inventor: David Christopher Wyles, Berkshire (GB)

(73) Assignee: FLEXERA SOFTWARE LLC, Itasca, IL (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/960,750

(22) Filed: Aug. 6, 2013

(65) Prior Publication Data

US 2014/0040221 A1 Feb. 6, 2014

Related U.S. Application Data

(63) Continuation of application No. 11/156,093, filed on Jun. 17, 2005, now Pat. No. 8,516,211.

(51) Int. Cl.
*G06F 12/02* (2006.01)
*G06F 17/30* (2006.01)
*G06F 9/50* (2006.01)
*G06F 9/52* (2006.01)
*G06F 12/08* (2006.01)

(52) U.S. Cl.
CPC ........ *G06F 17/30171* (2013.01); *G06F 9/5016* (2013.01); *G06F 9/526* (2013.01); *G06F 12/0804* (2013.01); *G06F 12/0866* (2013.01)

(58) Field of Classification Search
None
See application file for complete search history.

(56) References Cited

U.S. PATENT DOCUMENTS

| | | | |
|---|---|---|---|
| 5,913,213 A | 6/1999 | Wikstrom et al. | |
| 6,173,293 B1 | 1/2001 | Thekkath | |
| 6,502,169 B1 | 12/2002 | Noya | |
| 6,564,215 B1 | 5/2003 | Hsiao et al. | |
| 6,658,417 B1 | 12/2003 | Stakutis | |
| 7,173,863 B2 | 2/2007 | Conley et al. | |
| 8,516,211 B2 * | 8/2013 | Wyles | 711/163 |
| 2001/0019614 A1 | 9/2001 | Madoukh | |
| 2002/0165929 A1 | 11/2002 | McLaughlin et al. | |
| 2003/0033487 A1 | 2/2003 | Pfister | |
| 2003/0187860 A1 | 10/2003 | Holland | |
| 2004/0078568 A1 | 4/2004 | Pham et al. | |
| 2004/0107323 A1 | 6/2004 | Matsuura et al. | |

* cited by examiner

*Primary Examiner* — Charles Rones
*Assistant Examiner* — Ryan Dare
(74) *Attorney, Agent, or Firm* — Michael A. Glenn; Perkins Coie LLP

(57) ABSTRACT

The present invention provides a storage management system and method for managing access between a plurality of processes and a common store. According to the invention, each individual process comprises data processing means, a cache for the temporary storage of data generated by the data processing means, and a control unit for managing the transferral of data between the cache and a common store. The control unit comprises a manager for monitoring the availability of storage locations in the store to receive and store data and for allocating data to available storage locations, an interface for transferring the allocated data to the available storage locations, and a locking arrangement for locking the store during data transfer in order to ensure exclusive access and thereby preserve data integrity.

28 Claims, 13 Drawing Sheets

SECURE STORAGE MANAGEMENT SYSTEM AND METHOD

CROSS-REFERENCE TO RELATED APPLICATIONS

This patent application is a continuation of U.S. patent application Ser. No. 11/156,093, filed Jun. 17, 2005, SECURE STORAGE MANAGEMENT SYSTEM AND METHOD, the entirety of which is incorporated herein by this reference thereto.

FIELD OF THE INVENTION

The invention relates to a secure data storage management system and a method for the secure management of data storage.

BACKGROUND OF THE INVENTION

In the field of data storage, in the situation in which a number of parties has access to a single store, it is necessary to manage the communication links between the parties and the store, and the allocation of storage space within the store, to the respective parties, in such a way that the integrity and a consistent view of the data is maintained.

The different parties may, for example, be individual personal computers, individual machines in a computer network, individual operating systems in a computer network or different processes within a single operating system. All such parties are designated "processes" in the following text.

In order to ensure the integrity of stored data, it is known in a conventional storage management system to employ a common store manager for managing the inter-process communication between the processes and the store. A block diagram of such a conventional storage management system is shown in FIG. 1. As shown, the system comprises a plurality of processes 10, designated process 1, process 2 ... process N, in communication with a store 12 by way of respective communication links 14 via a store manager process 16. The store manager process 16 receives requests from the processes 10 by way of the communication links 14 to read and write data to the store 12, and is responsible for processing concurrent requests into a single queue of serial requests in which data integrity is preserved. In practice, the store manager process 16 employs a cache 18 as temporary memory capacity and will only update the store 12 at the end of a data commit cycle. This has the advantage of enhancing processing speed, since the cache is a relatively fast device by comparison with the store 12.

One disadvantage of the storage management system shown in FIG. 1 is that the inter-process communication in this type of system is not generally secure, so that it is possible for data to be intercepted and manipulated.

Another disadvantage of the storage management system shown in FIG. 1 is that it requires a separate additional process in the form of the store manager process, together with an associated cache, for managing the data storage.

Such a store manager process consumes resources and cycles of the central processing unit of the overall system, and the need to channel all the read and write requests from the different processes 10 into a separate additional process, all reduce the performance and speed of operation of the overall system. Further, the communication to the store manager process would require a communications protocol, which again adds a performance overhead. There may also be circumstances where it is uneconomical or impractical to supply a store manager process 16, for example in an existing computer system having a store 12 to which new processes 10 may be added but where no store manager process 16 currently exists.

SUMMARY OF THE INVENTION

It is an object of the present invention to provide a storage management system and method in which the need for a supplementary store manager process is avoided.

It is another object of the present invention to provide a storage management system and method, which is capable of managing concurrent requests from a plurality of processes for access to a single data store.

It is another object of the present invention to provide a storage management system and method, which is capable of managing concurrent requests from a plurality of processes for access to a data store, in a manner which preserves data integrity and which provides secure storage.

It is another objection of the present invention at least in its preferred form to provide a storage management system and method, which is fault tolerant.

It is another object of the present invention at least in its preferred form to provide a storage management system and method, in which the means for managing storage in a shared store is included within a basic process.

According to the present invention, there is provided a storage management system comprising: data processing means, a cache for the temporary storage of data generated by the data processing means, and a control unit for managing the transferral of data between the cache and a common store, the control unit comprising: a manager for monitoring the availability of storage locations in the store to receive and store data and for allocating data to available storage locations, an interface for transferring the allocated data to the available storage locations, and a locking arrangement for locking the store during data transfer in order to ensure exclusive access and thereby preserve data integrity.

The present invention also provides a shared network comprising: a plurality of processes, a common store, and a respective storage management system for each process, such storage management system comprising: data processing means, a cache for the temporary storage of data generated by the data processing means, and a control unit for managing the transferral of data between the cache and a common store, the control unit comprising: a manager for monitoring the availability of storage locations in the store to receive and store data and for allocating data to available storage locations, an interface for transferring the allocated data to the available storage locations, and a locking arrangement for locking the store during data transfer in order to ensure exclusive access and thereby preserve data integrity.

Additionally, the present invention provides a method of storage management comprising: generating data by means of data processing means, temporarily storing in a cache data generated by the data processing means, and managing the transferral of data between the cache and a common store, by means of steps comprising: monitoring the availability of storage locations in the store to receive and store data, allocating data to available storage locations, transferring the allocated data to the available storage locations, and locking the store during data transfer in order to ensure exclusive access and thereby preserve data integrity.

BRIEF DESCRIPTION OF THE DRAWINGS

The invention is described further, by way of example only, with reference to the accompanying drawings in which:

FIG. 6 is a flowchart of a sub-routine of the routine in FIG. 5a;

FIGS. 8 to 10 are flowcharts of sub-routines in the routine of FIG. 5a;

DESCRIPTION OF PREFERRED EMBODIMENTS

Figure 1:
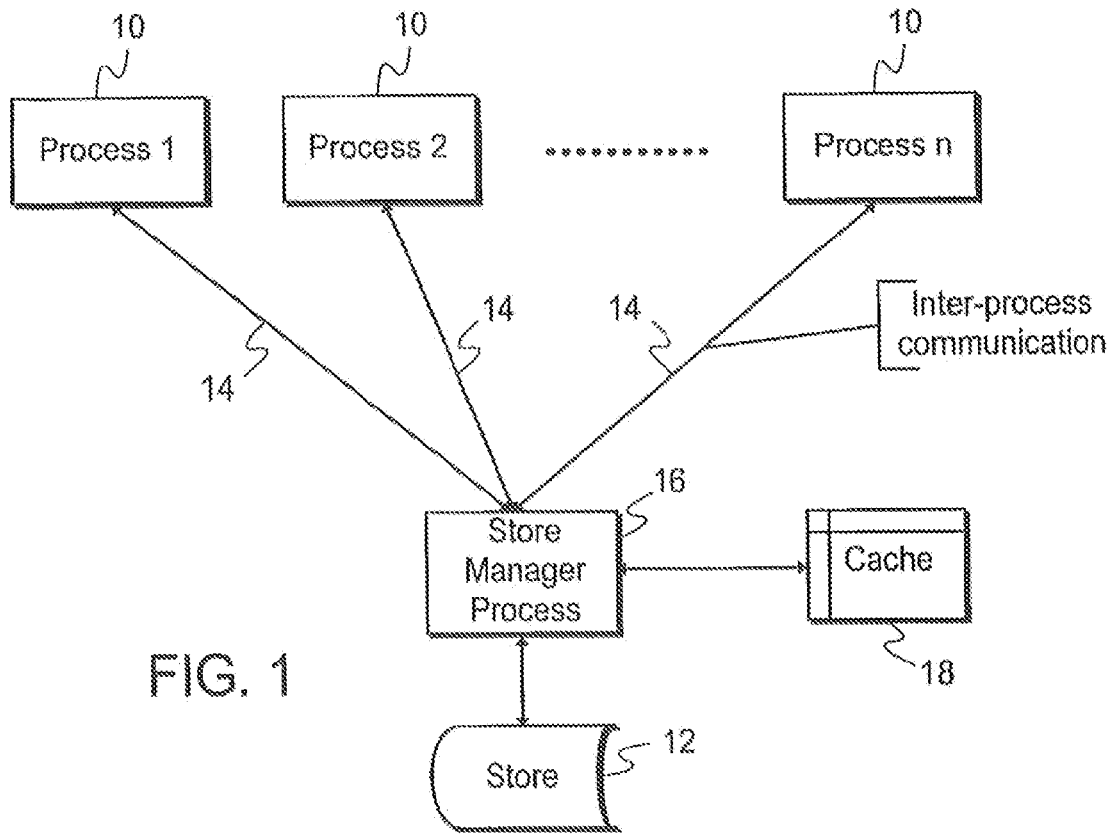
FIG. 1 is a block diagram of a conventional storage management system.

The invention will now be described with reference to an embodiment shown in the drawings. It is to be understood that the described embodiment is illustrative only, and that various modifications are possible, some of which will be mentioned in the following description.

A preferred embodiment of the invention will now be described with reference initially to FIG. 2 of the drawings. According to this preferred embodiment, a storage management system comprises a plurality of processes 20, designated process 1, process 2, . . . process N. The processes 20 are each in communication with a data store 22 by way of an operating system provided store access, designated by the line 24. In order to manage the shared access, each process 20 includes a respective multiple addressable fault tolerant secure storage (MAFTSS) control unit 26, which is arranged to cooperate with an associated cache 28 for managing access to and use of the store 22.

More particularly, block storage is employed to manage the data and store it in the store 22, and the control unit 26 provides for encryption and verification of the data and for the management of data storage blocks within the store 22 so that the store 22 can be shared between multiple user processes.

Figure 2:
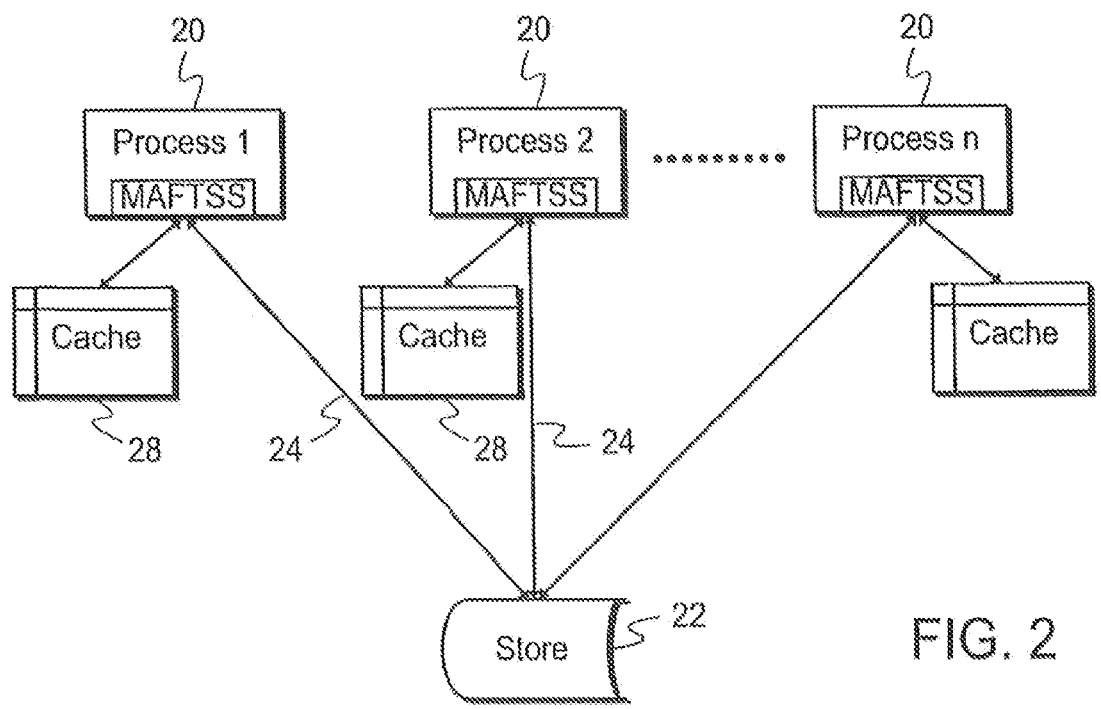
FIG. 2 is a block diagram of a storage management system according to the present invention.

FIG. 2 shows a plurality of the processes 20 with associated caches 28 and a single store 22. It is to be appreciated that the entire system may be part of a single operating system, or the system apart from the store 22 may be part of a single operating system with an external store 22, or each process 20 and associated cache 28 may be part of a respective operating system each associated with a single external store 22. In the last instance, each process 20 and associated cache 28 may comprise a single computer so that the processes are in separate machines. Further, the store 22 may be any type of store, including a flash store or a mechanical store. In each case, however, the system must include provision for exclusively locking the store 22, as will be described below.

In the present embodiment, the processes 20 and the MAFTSS control units 26 are all software programs, with the control units 26 being in the form of software algorithms. It is, however, possible for the processes 20 and/or the control units 26 to be in the form of hardware products, for example with a respective process 20 comprising a hardware device within which is embedded a hardware component comprising the control unit 26.

A respective one of the control units 26 will now be described with reference to FIG. 3, and subsequently the management of data storage using this control unit 26 will be described with reference to FIGS. 4 to 15. Since the basic structure and operation of all of the control units 26 is the same, it suffices to describe only one.

Figure 3:
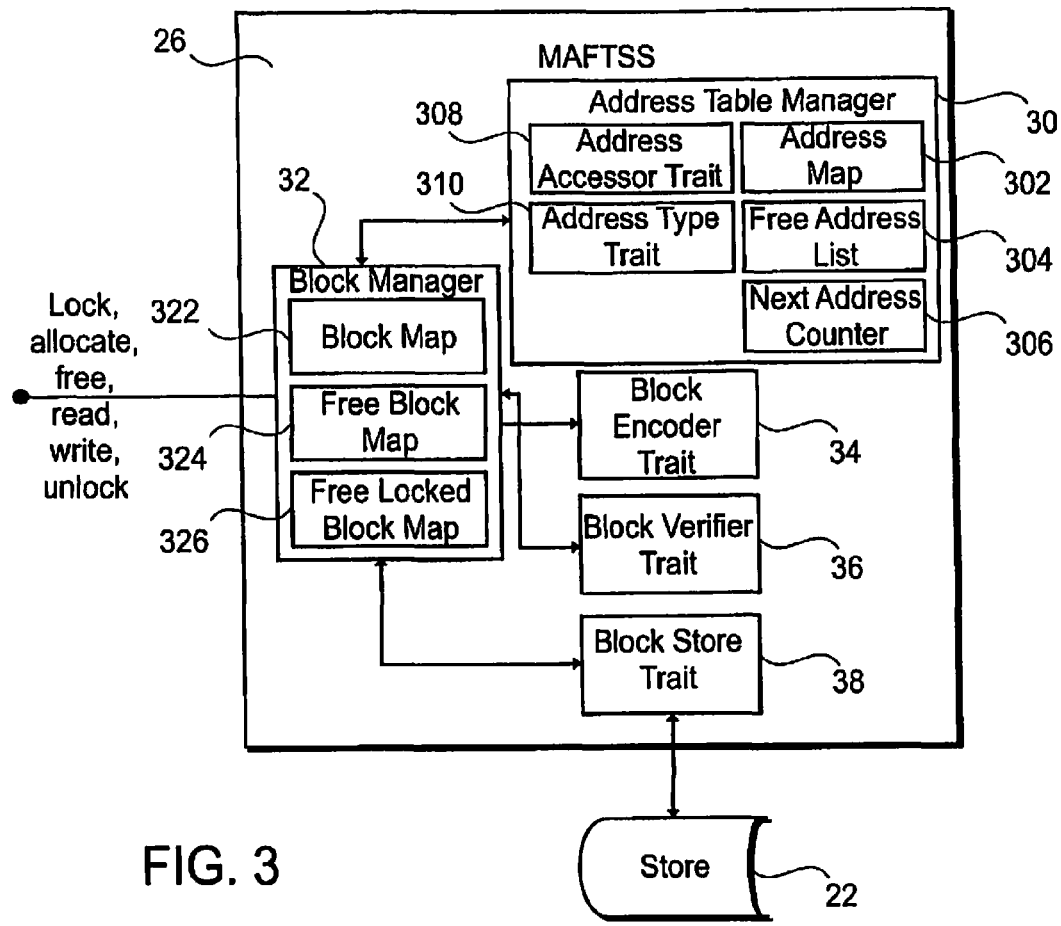
FIG. 3 is a block diagram of a storage management unit shown in FIG. 2 and embodying the present invention.

Referring to FIG. 3, the control unit 26 comprises a number of processing routines and sub-routines having different functions. More particularly, the control unit 26 comprises an address table manager 30 for managing the allocation, of and access to, addresses in the store 22. The address table manager 30 cooperates with a block manager 32 for designating and using specific storage blocks in the store 22.

For this purpose, the block manager 32 comprises a block map 322, which represents all the storage blocks currently in existence in the store 22, whether allocated or not. The store operates on the basis of storing data using a base address and relative addresses, and hence the block map 322 is effectively a map of offsets and block sizes. The block manager 32 also comprises a free block map 324, which represents all those blocks in the store 22 which have not yet been allocated, and a free locked block map 326, which represents those blocks that have previously been allocated and are no longer needed but are temporarily unavailable for reasons to be explained below. The address table manager 30 comprises an address map 302, representing all the blocks that have been allocated. In other words, the address map 302 contains a list of addresses for the allocated blocks. The address table manager 30 further comprises a free address list 304 representing addresses to blocks that have previously been allocated and are no longer needed so that the addresses are now free to reuse. The address table manager also includes a next address counter 306, an address accessor trait 308 and an address type trait 310, for designating respectively the number and location of the next free addresses to allocate and the address version for this next free address.

Further functions included within the control unit 26 are a block encoder trait 34 for the encryption of data, a block verifier trait 36 for the verification of data, in particular for the detection of data corruption, and a block store trait 38 representing the store 22 and enabling access to the store 22 by means of a simple application program interface (API). With reference to the block verifier trait 36, the type of data corruption that is detectable will depend on the nature of the verification algorithm that is employed.

At any one point, the control unit 26 ensures that there are two working sets of process data in the storage system from the processes 20, namely the current process data and previous process data that was previously current. In addition, the control unit 26 stores within the store 22 a set of management data representing the data employed by the control unit 26 itself and comprising the following:

A map of offsets and sizes (the data in the block map 322)

A list of free offsets (the data in the free block map 324)

A list of locked free offsets (the data in the free locked block map 326)

A map of addresses (the data in the address map 302)

A list of free addresses (the data in the free address list 304)

The maximum allocated address represented as a number starting at 0 (based on the data in the next address counter 306 and the data in the address accessor and address type traits 308, 310)

Figure 4:
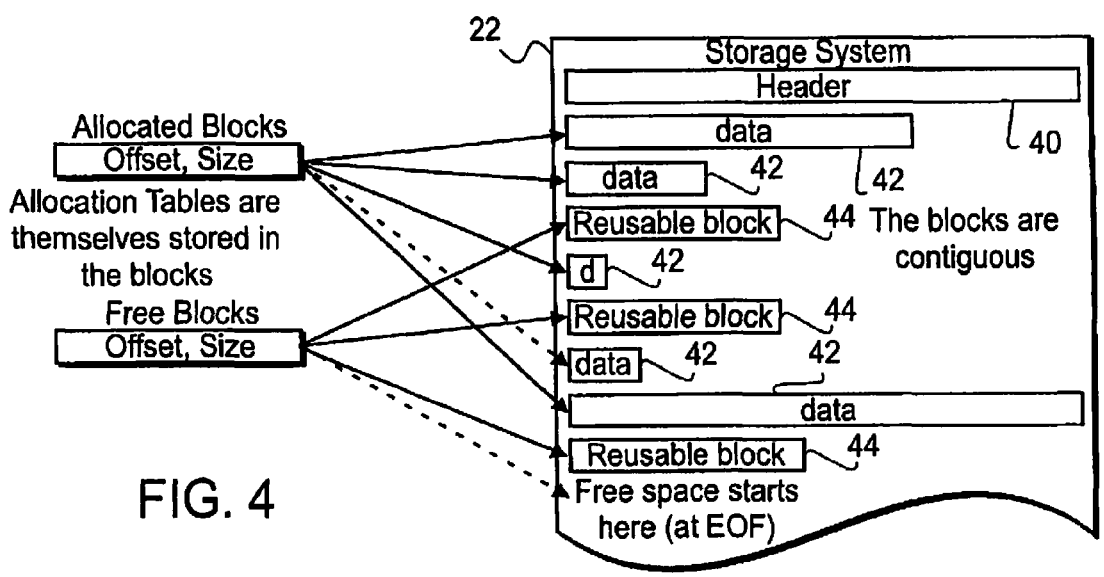
FIG. 4 is a diagrammatic view showing the contents of a store in FIG. 3.

FIG. 4 shows how data is stored in the store 22. The store 22 comprises a header 40 containing a base address for each set of data, a series of allocated data blocks 42 located by means of their offset and their size, and a series of free blocks 44 designated by means of their offset and their size. The header, the allocated blocks 42 and the free blocks 44 comprise a file in the store 22, following which free storage space is available for use by other processes 20 when they have access to the store 22.

The basic use of the control unit 26 including the routines for writing data to the store 22, reading data from the store 22 and freeing an address in the store 22 are illustrated respectively in FIGS. 5a, 5b and 5c. In each of these routines, the process code for the system uses the code for the control unit 26 to initiate and control a sequence of events as illustrated. It is to be understood that these events may not follow immediately one on the other but may take place with substantial time lapses between them.

According to the process illustrated in FIG. 5a, the process code first writes data to the associated cache 28 and then transfers the data from the cache 28 to the store 22 under the control of the code for the control unit 26. According to the process illustrated in FIG. 5b, the process code first reads data from the store 22 and then transfers data to the associated cache 28 under the control of the code for the control unit 26. According to the process illustrated in FIG. 5c, the process code frees an address that has previously been allocated in the store 22, by verifying that the data at this address is no longer required and by adding the address to the free address list 304.

Figure 8:
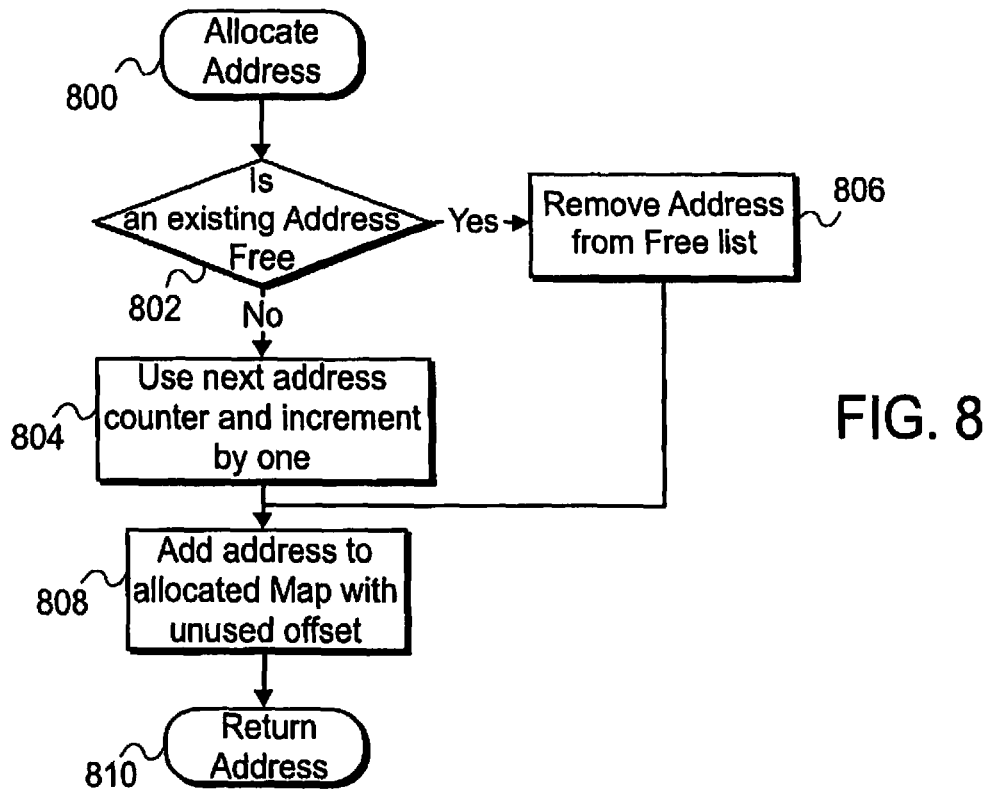
Figure 9:
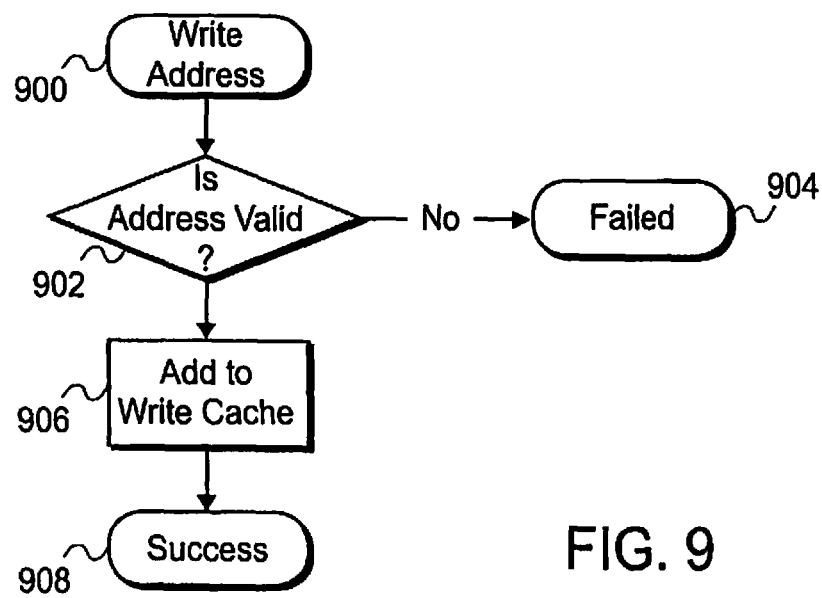

Referring now particularly to FIG. 5a, the process of writing data to the store 22 commences with step 500 when a write instruction is received from some part of the process 20. The process code proceeds to step 502 and locks the store 22 by means of the sub-routine shown in FIG. 6 as described below. Locking the store 22 ensures that the process 20 has exclusive access to the store 22 for the duration of the write routine and that no other process 20 can have access at a time when the data might be corrupted. In this way, data integrity is assured. Having locked the store 22, the process code proceeds in step 504 to allocate from the free address list 304 an address in the store 22 and in step 506 to write data to be entered in that address. In practice, at this stage, the information regarding the address which has been allocated and the data for writing to that address are stored in the cache 28. The sub-routines for address allocation and data writing are illustrated in FIGS. 8 and 9 as described below. Next, the process code proceeds to step 508 and transfers the data from the cache 28 to the allocated address in the store 22, following which the process code unlocks the store 22 by means of a sub-routine illustrated in FIG. 10 and described below. The data writing routine now advances to step 510 and is complete.

Turning to FIG. 5b, a read routine commences when a read instruction is received from the process 20 in step 512. The process code proceeds to step 514 and reads the data from the given address in the store 22 by means of the sub-routine illustrated in FIG. 13 and described below. The read data is transferred from the store 22 to the cache 28 and the process code then proceeds to step 516 signifying that the read routine is complete. Locking of the store 22 is required in this routine, but is locking of a different kind from that shown in FIG. 5a, as will be described below in relation to FIG. 15.

Figure 17:
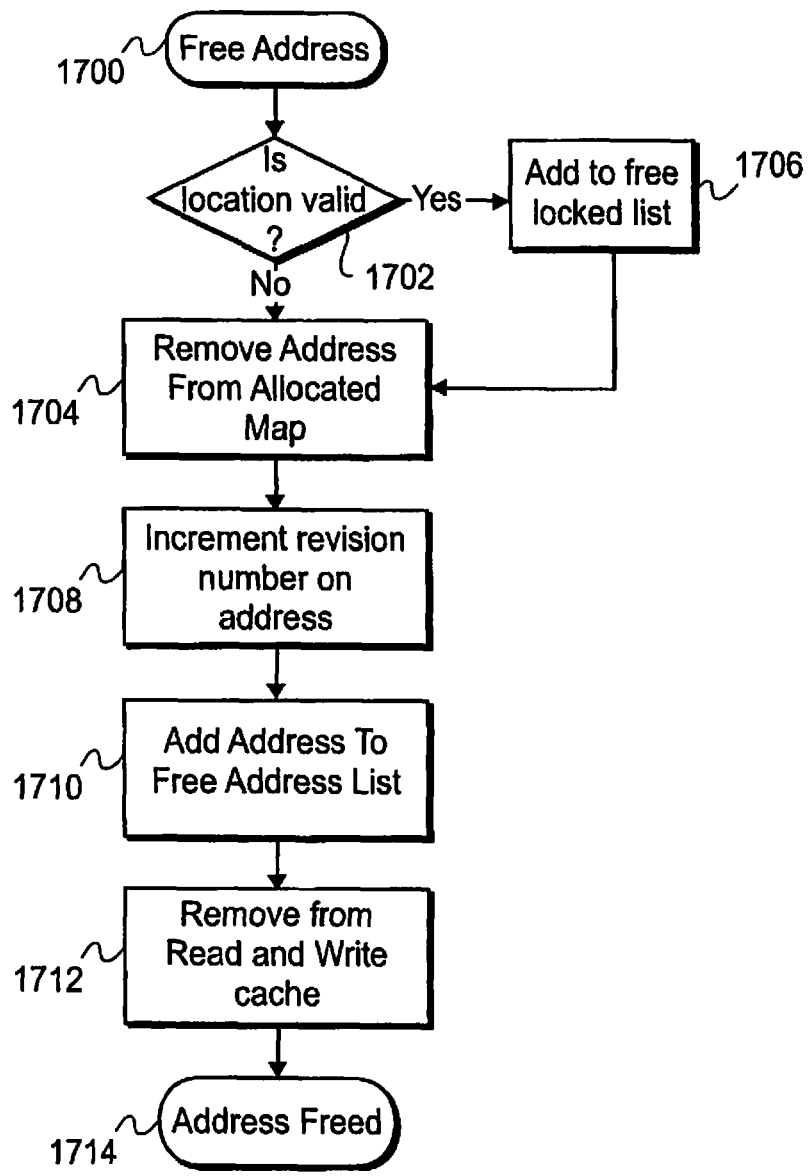
FIG. 17 is a flowchart of a sub-routine in the routine of FIG. 5c.

Referring next to FIG. 5c, the process for allocating an address will be described. When data that has been written to the store 22 is to be deleted because it is no longer required by the user, the process 20 indicates in step 518 that the data is no longer required and that the associated address in the store 22 can be freed and made available for reuse. The process code then proceeds to step 520, in which the store 22 is locked by means of the same routine employed in step 502 of FIG. 5a and illustrated in FIG. 6 as described below. The process code subsequently proceeds to free the relevant address in the store 22 and to add that address to the free address list 304 in the control unit 26 by way of the cache 28 as illustrated in FIG. 17 and described below. Finally, the process code unlocks the store 22 again in step 524 using the same rub-routine as in step 508 of FIG. 5a and illustrated in FIG. 10. The process code now proceeds to step 526 and signifies that the routine for freeing the address has been completed.

Various details of the sub-routines illustrated in FIGS. 5a to 5c will now be described with reference to FIGS. 6 to 17. The steps of allocating an address in the store 22 and assigning that address to data in the cache 28 will be described first with reference to FIGS. 8 and 9, and then the steps of reading an address in the store will be described with reference to FIGS. 14 and 15. Next, the sub-routine for freeing an address in the store 22 will be described with reference to FIG. 17, and finally the main sub-routines according to the invention of locking and unlocking the store 22 and transferring data to and from the store 22 will be described with reference to FIGS. 6, 7 and 10 to 14.

The process of allocating an address in step 504 of FIG. 5a is illustrated in FIG. 8 and commences at step 800 when the process unit 20 issues an instruction to allocate an address in the store 22 for writing data. In step 802, the control unit 26 enquires of the free address list 304 whether a particular existing address is free. If the answer is no, the control unit 26 increments a count value in the next address counter 306 by 1. When the outcome of step 802 is a yes, indicating that an existing free address has been located, the control unit 26 proceeds to step 806 and removes this address from the free address list 304. Next, the control unit 26 proceeds to step 808 and adds the new address to the address map 302, at the same time adding to the address type trait a revision number for the address. The control unit 26 then proceeds to step 810 and returns the address in the store 22 to which the data is to be written.

The writing of the data in step 506 as illustrated in FIG. 9 proceeds with a write address instruction issued by the process unit 20 in step 900. The control unit 26 proceeds to step 902 and enquires whether the address that has been returned in step 810 is a valid address, i.e. whether the addresses is to be found in the address map 302 and whether the revision number for the address matches that shown in the address type trait. If the answer is no, the control unit 26 records a failed writing result in step 904. On the other hand, if the address is considered to be valid in step 902, the control unit 26 adds the address and the data to be written to a write portion of the cache 28 in step 906. The control unit 26 then records a successful writing outcome in step 908.

Figure 15:
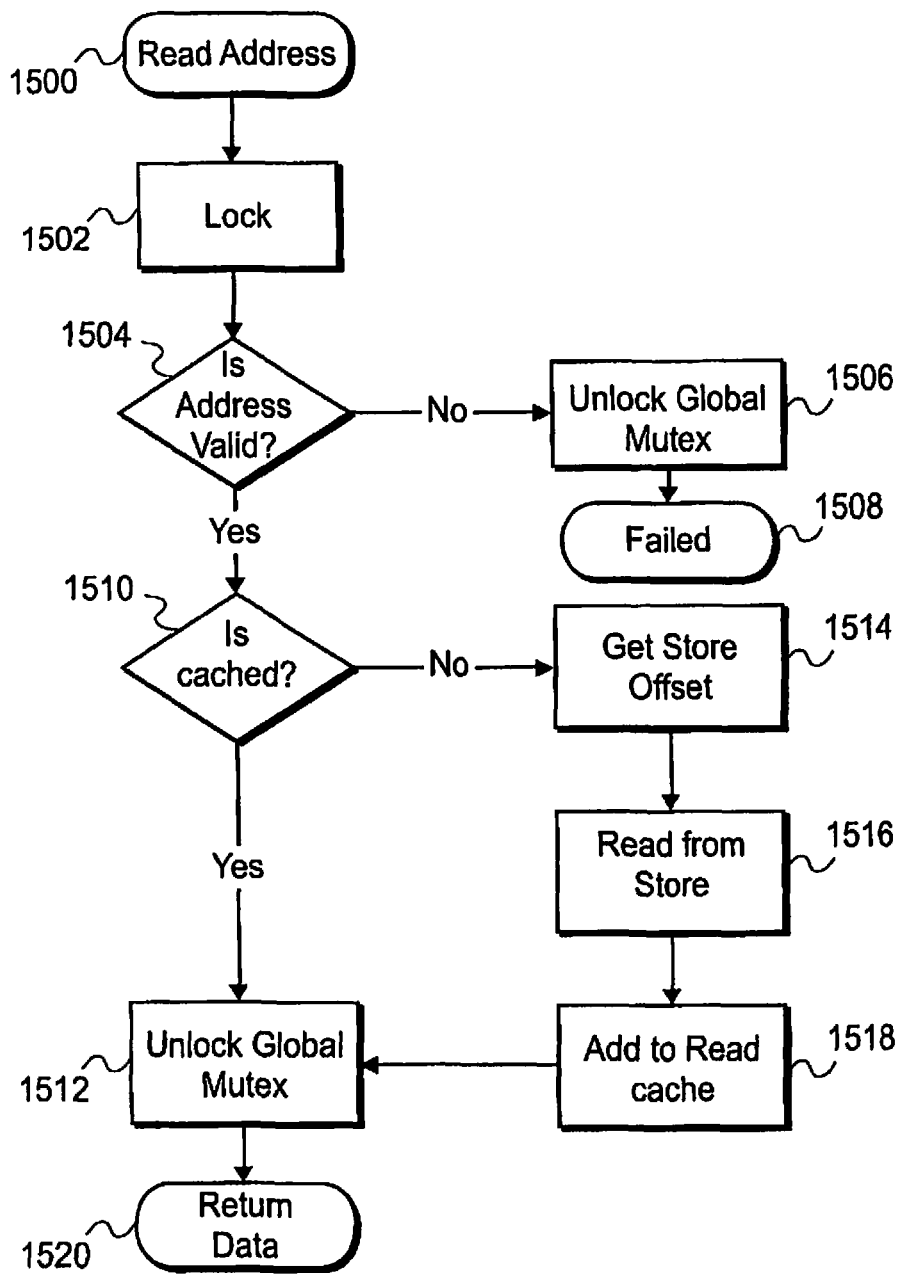
FIG. 15 is a flowchart of a sub-routine in the routine of FIG. 5b.

Reading data from the store 22 and transferring data from the store 22 to the cache 28 as mentioned with reference to step 514 in FIG. 5b is illustrated in FIG. 15 and commences with the process unit 20 issuing a read address instruction in step 1500 giving a selected address in the store 22. In step 1502, the control unit 26 locks the store 22 and, in step 1504, the control unit 26 enquires whether the address given is a valid one, i.e. whether it is an address in the store 22 containing readable data. If the answer to the enquiry of step 1504 is a no, then the control unit 26 proceeds to step 1506 and unlocks the store 22 and records a failed read address attempt in step 1508. On the other hand, if the outcome of the enquiry in step 1504 is a yes, the control unit 26 proceeds to step 1510 and enquires whether the contents of this address are to be found in the cache 28. If the answer is yes, the control unit 26 proceeds to step 1512 and unlocks the store 22 and, in step 1520 returns the data from the cache 28. On the other hand, if the answer to the enquiry in step 1510 is a no, the control unit proceeds to step 1514 and obtains the offset value in the store 22 for the relevant address. The control unit 26 then accesses the respective store offset in step 1516 from the address for the relevant data using a sub-routine illustrated in FIG. 16, and reads the data and transfers it in step 1518 to the cache 28. The control unit 26 then reverts to step 1512 and unlocks the store 22 and, in step 1520 returns the relevant data from the cache 28.

Figure 16:
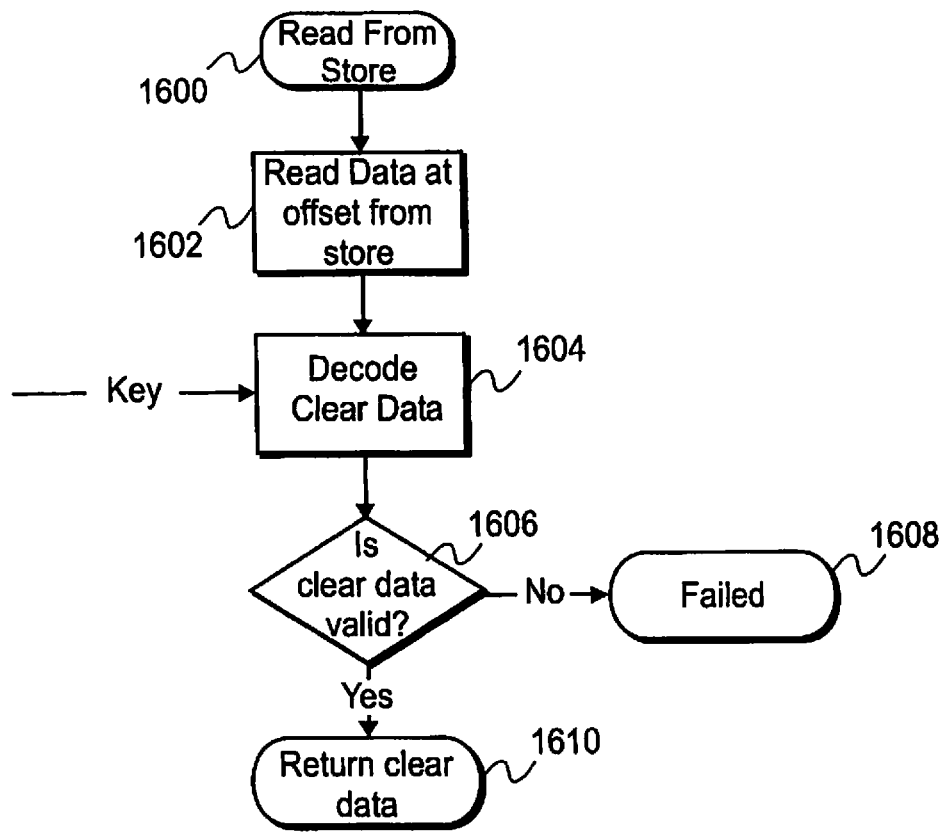
FIG. 16 is a flowchart of a sub-routine in the sub-routine of FIG. 13.

The sub-routine for reading the data from the store in step 1516 as illustrated in FIG. 16 commences with an instruction in step 1600 to read the data from the store 22. In step 1602, the control unit 26 reads the data at the given offset in the store 22, which data is encrypted, and then in step 1604 decodes the encrypted data by means of a key from the block encoder trait 34. In step 1606, the control unit 26 then enquires whether the decoded data is valid, i.e. not corrupted, using the block verifier trait 36. If the answer is no, the control unit 26 records a failed data reading routine in step 1608. However, if the result to the enquiry of step 1606 is a yes, the control unit 26 reverts to step 1518 and transfers the decoded data from the store 22 to the cache 28.

The sub-routine for deleting data and freeing an address in the store 22 indicated in step 522 of FIG. 5c is illustrated in FIG. 17 and will now be described. When the control unit 26 receives a free address instruction from the process unit 20 in step 1700, the control unit 26 checks in step 1702 whether the location for the address is valid, i.e. whether the address given carries readable data. If the answer is no, signifying that the address does not contain any useful information and can be overwritten, the control unit 26 removes the address for this offset from the address map 302 in step 1704. If, however, the outcome of the enquiry in step 1702 is a yes, signifying that the address although available for reuse still contains information that cannot yet be overwritten because previous data is still required for reasons to be explained below, the control unit proceeds to step 1708 and adds the address to the free locked block map 326. The control unit 26 then proceeds to step 1704 as before. Next, the control unit 26 proceeds to increment a revision number on the address so as to represent the current revision number for the data at the relevant address in step 1708. Then, in step 1710 the control unit 26 adds the address to the free address list 304 in the address table manager 30. The control unit 26 then proceeds to step 1712 and removes the data from the read and write portions of the cache 28 and indicates in step 1714 that the address has been freed.

Figure 5:
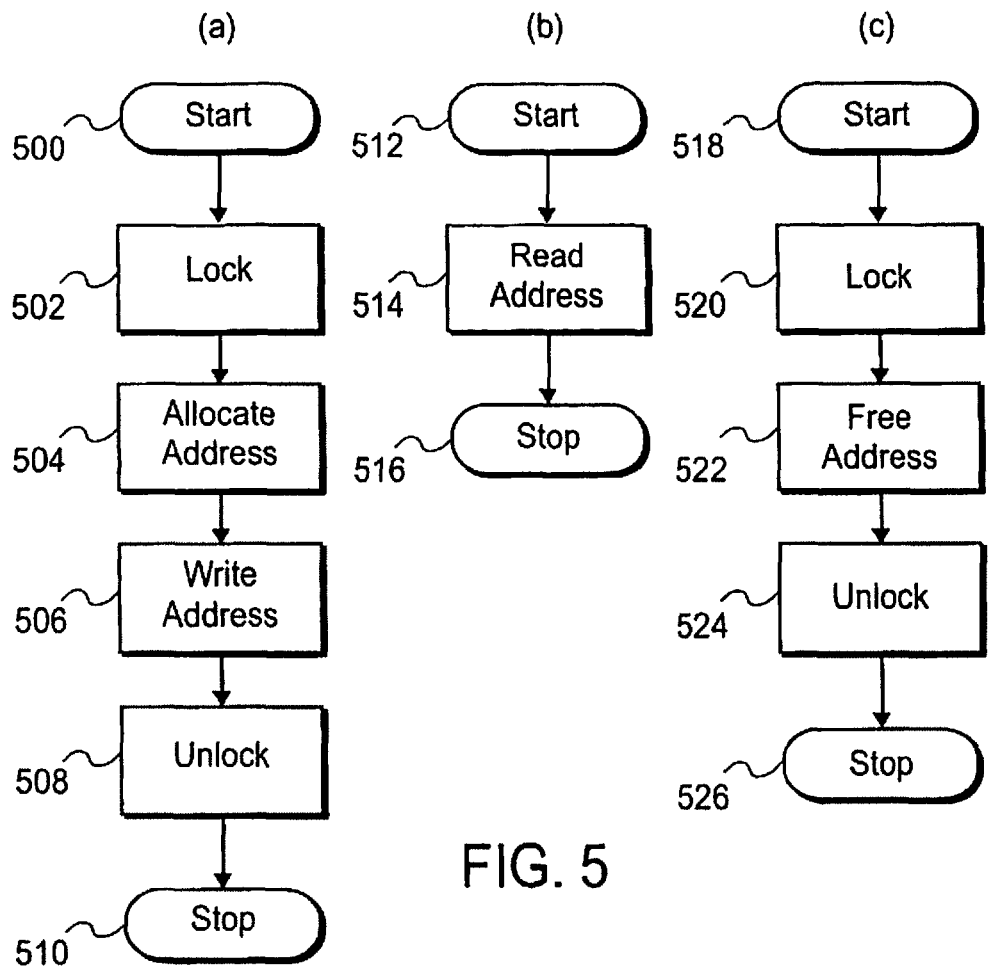
FIGS. 5a, 5b and 5c are flowcharts representing basic routines of the store management unit of FIG. 3.

According to the invention, the store 12 is locked while data is transferred from the cache 28 to the store 22 and while data is altered in the store 22. The sub-routines for locking the store for this purpose are illustrated in FIG. 5 as steps 502 and 520, while the sub-routines for subsequently unlocking the store 22 are illustrated in FIG. 5 as steps 508 and 524. These sub-routines will now be described, starting with the locking sub-routine, which is illustrated in FIGS. 6 and 7.

Figure 6:
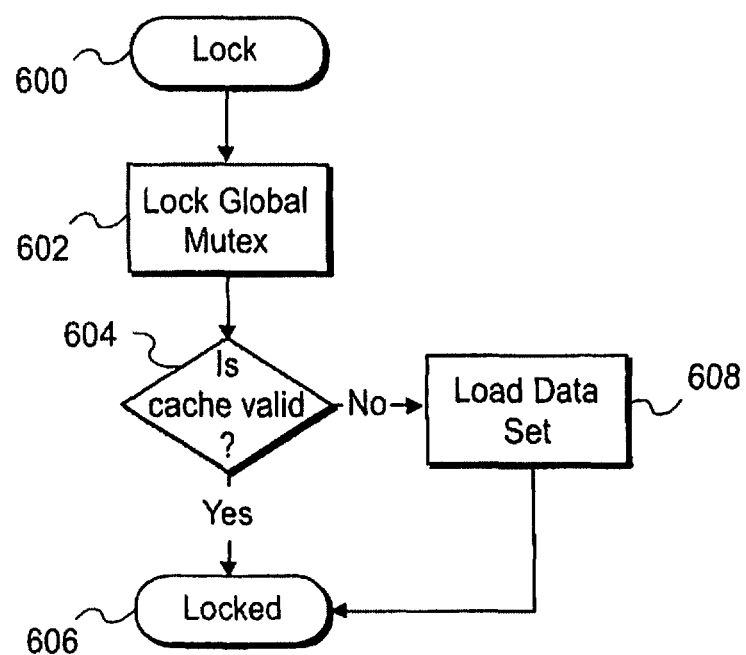

FIG. 6 is a flowchart representing the steps in the lock sub-routine of steps 502 and 520 of FIGS. 5 and 1502 of FIG. 15. Firstly, a lock instruction is issued by the process unit 20 in step 600. In step 602, the control unit 26 generates a mutex with a unique identifier and employs this to achieve a global lock on the store 22. The control unit 26 then proceeds to step 604 and checks whether the data in the cache 28 is valid. In other words, the control unit 26 checks whether the cache 28 contains an up-to-date representation of the relevant process and management data that is in the store 22. If the answer is yes, the control unit 26 proceeds to step 606 and the locking sub-routine is completed. On the other hand, if the answer to the question in step 604 is no, the control unit 26 proceeds to step 608 and loads the relevant data from the store 22 into the cache 28 so that the control unit 26 can work with data in the cache 28 for the remaining duration of the lock cycle. Subsequently, the control unit 26 proceeds from step 608 to step 606 and the locking sub-routine is complete.

Figure 7:
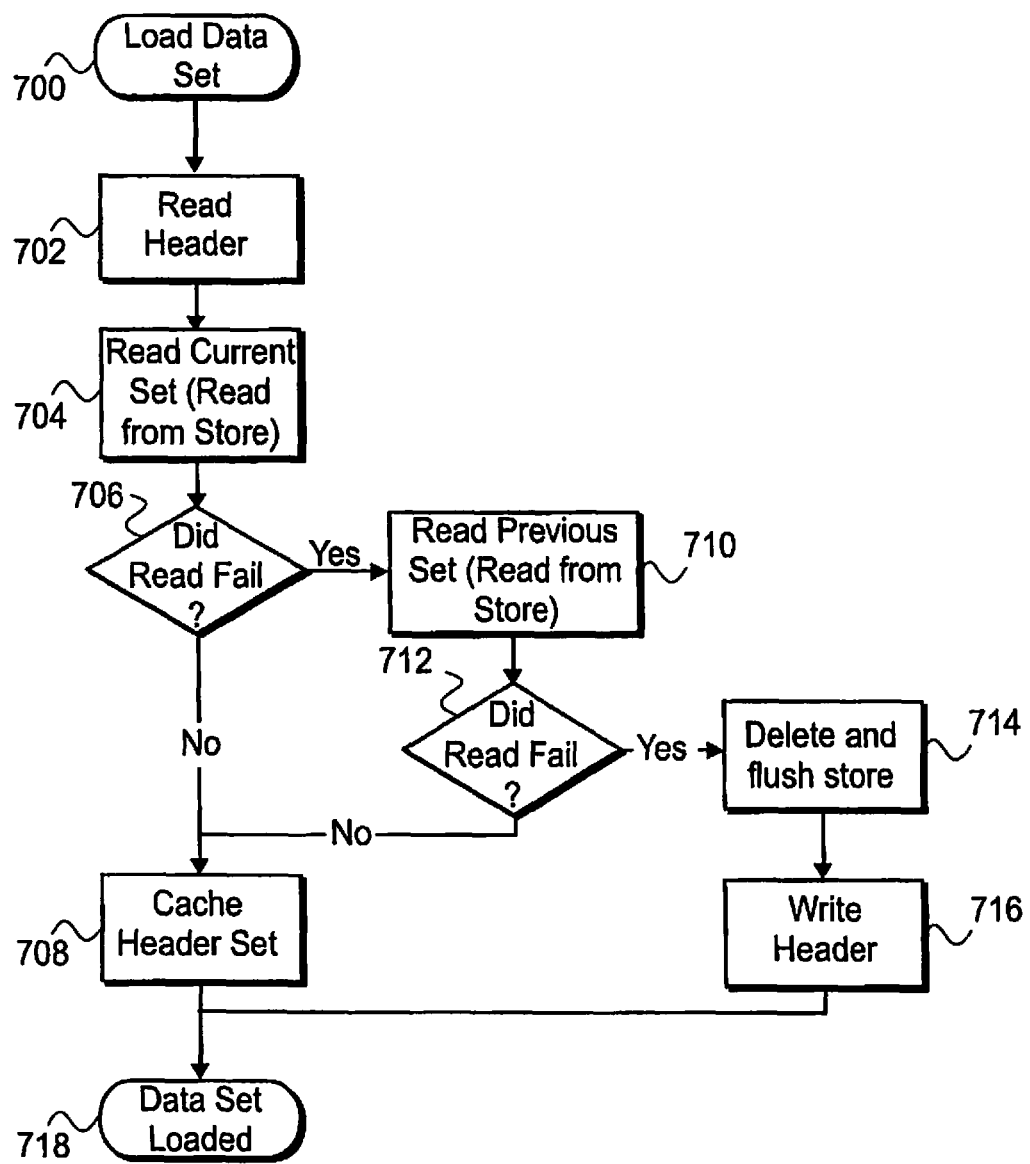
FIG. 7 is a flowchart of a sub-routine in the sub-routine of FIG. 6.

The sub-routine 608 for loading the management data set is illustrated in FIG. 7 and will be described next. When step 604 in FIG. 6 indicates that the management data in the cache 28 is not up-to-date, the control unit 26 issues an instruction to load up-to-date management data in step 700. The control unit 26 then proceeds in step 702 to read the header 40 in the store 22, and thence in step 704 to read and decrypt the current data set in the allocated blocks 42 in the store 22. Following step 704, the control unit 26 asks whether reading has failed in step 706 by checking the header for the management data to see whether the file is invalid and contains corrupt data, or by noting that the decryption failed, for example. In the event that reading has not failed, and is therefore complete, the control unit 26 proceeds to step 708 and loads from the store 22 into the cache 28 whatever data is going to be needed in the next data management routine. Such data is loaded into the cache header while data that would be superfluous to the next data management routine is retained in the store 22. In the event for any reason that data reading of the current data set in the store 22 is judged in step 706 to have failed, the control unit 26 instead proceeds to step 710 and commences reading the previous data set held in the store 22. When the previous data set has been read, the control unit 26 again asks in step 712 whether reading has failed. If the answer is no, the control unit 26 reverts to step 708 and loads into the cache 28 from the previous data stored in the store 22 the data that will actually be needed. On the other hand, if the control unit 26 judges in step 712 that reading of the previous data set has failed, the control unit 26 proceeds to step 714 and deletes the entire store 22, following which the control unit 26 writes a new header 40 for the store 22 in step 716. Finally, the control unit 26 proceeds from step 708 or step 716 as appropriate to step 718, which indicates that the data set in the store 22, insofar as one is available, has been loaded into the cache 28.

The locking sub-routine shown in steps 502 and 520 in FIGS. 5a and 5c has been described. The unlocking sub-routine of steps 508 and 524 in FIGS. 5a and 5c will now be described with reference to FIGS. 10 to 14.

Figure 10:
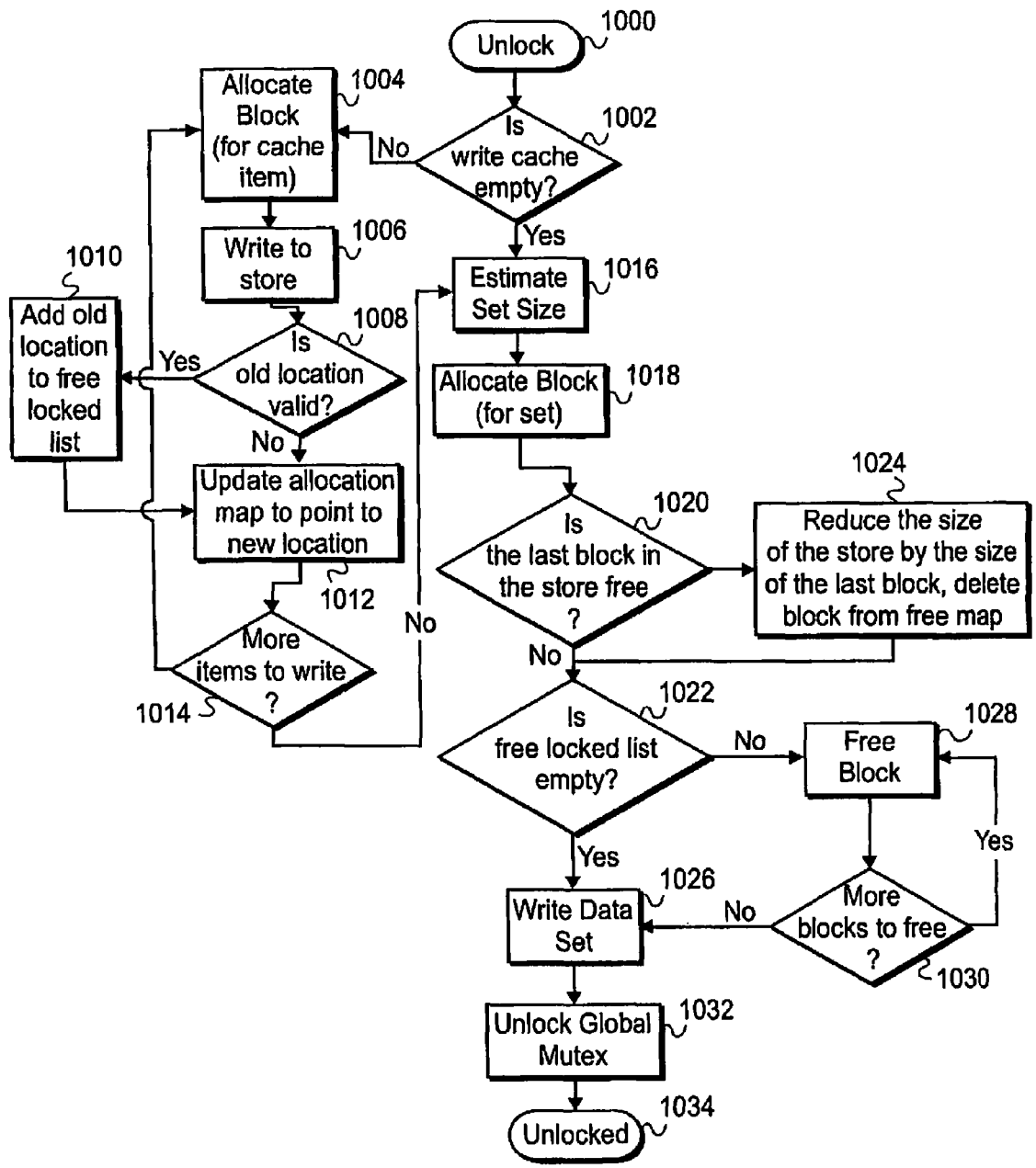

The basic unlocking sub-routine is shown in FIG. 10 and commences at step 1000. When whatever data management routine that is needed has been completed using the cache 28, and with the store 22 in a locked state, the process unit 20 issues an unlock instruction in step 1000. At this point, all the information from the recent data management routine held in the cache 28 will be in need of transferring to the store 22 before unlocking can take place. Therefore, the control unit 26 proceeds to step 1002 and checks whether any data has been written to the cache 28. More especially, the control unit 26 enquires whether the write cache (that portion of the cache allocated for writing) is empty and whether any process data has been written to the write cache.

In the event that the response to the enquiry as to whether the write cache 28 is empty is a no, then the control unit proceeds to step 1004 and allocates a block in the store 22 for the process data contained in the write cache 28. Next, in step 1006, the control unit 26 commences writing such process data into the store 22. In step 1008, the control unit 26 enquires whether there already exists in the store 22 a valid old location for this particular process data. If the answer is yes, then in step 1010 the control unit 26 adds this location to the free locked block map 326, in order temporarily to preserve this previous set of data, and then proceeds to step 1012. If the answer to the enquiry in step 1008 is no, the control unit 26 proceeds directly to step 1012. In step 1012, the control unit 26 updates the block map 322 to indicate a new location in the store 22 for the current process data. The control unit 26 then proceeds to step 1014 and enquires whether there are more process items in the cache to write to the store 22, and if the answer is yes reverts to step 1004 to allocate a new block in the store 22 for such further process data. If the answer is no, then the control unit 26 proceeds to step 1016.

Reverting to step 1002, if the control unit 26 finds that the write cache is empty, the control unit 26 proceeds directly to step 1016 and estimates the size of the management data set in the cache 28, and then allocates a suitable block or blocks 44 in the store 22 for the management data in step 1018. In step 1020, the control unit 26 checks for free blocks at the end of the store 22. If none are located, the control unit proceeds directly to step 1022. On the other hand, if any such free blocks are located, the control unit 26 discards them and thereby reduces the size of the store 22. The control unit 26 then proceeds again to step 1022, in which it enquires whether the free locked block map 326 of offsets that have become free in this cycle but that could not hitherto be overwritten because they contained previous data is empty. If the answer to the enquiry in step 1022 is yes, then the control unit 26 proceeds to step 1026 and writes a new data set in the store 22 representing the current management data set whose size was estimated in step 1016. On the other hand, if the outcome of step 1022 is that the free locked block map 326 is not empty, the control unit 26 proceeds to step 1028 and frees up the first of the now available blocks in the store 22. This means that the block could not be overwritten in this cycle and will thus in the next cycle contain data from the previous data set, following which it can then be overwritten. The control unit 26 then proceeds to step 1030 and enquires whether the free locked block map 326 is yet empty or whether there remain more blocks to free. If the answer is yes, the control unit 26 reverts to step 1028 and frees another block. If the answer is no, the control unit 26 proceeds to step 1026 and now writes the management data set in the store 22. Having done this, the control unit 26 unlocks the store 22 in step 1032 and issues an indication in step 1034 that the unlocking process is complete.

The sub-routines involved respectively in step 1006 where process data is written to the store 22; step 1018 where the control unit 26 allocates blocks for the management data; step 1028 where available blocks are freed; and step 1026 where management data is written in the store 22 are shown in FIGS. 11 to 14 and will now be described.

Figure 11:
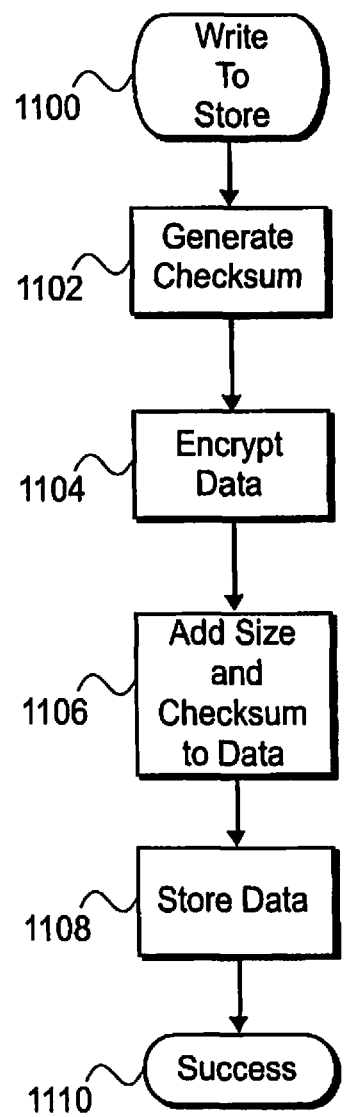
FIGS. 11 to 14 are flowcharts of sub-routines in the sub-routine of FIG. 10.

FIG. 11 shows the sub-routine for writing process data to the store 22. When there is process data in the cache 28 to be written to the store 22 in step 1006, the control unit 26 issues a write to store instruction in step 1100, and then in step 1102 generates a checksum value to be added to the data for subsequent monitoring of data validity. This checksum value is generated by the block manager 32 with reference to the block verifier trait 36. Next, the control unit 26 proceeds to step 1104 and encrypts the data in the cache 28 using an encryption algorithm contained in the block encoder trait 34. In step 1106, the control unit 26 calculates the size of the encrypted data and adds to the header for the encrypted data a size value and the checksum value. Next, in step 1108, the control unit 26 transfers the data from the cache 28 to the store 22 and stores it therein. A data writing success indication is then issued in step 1110.

Figure 12:
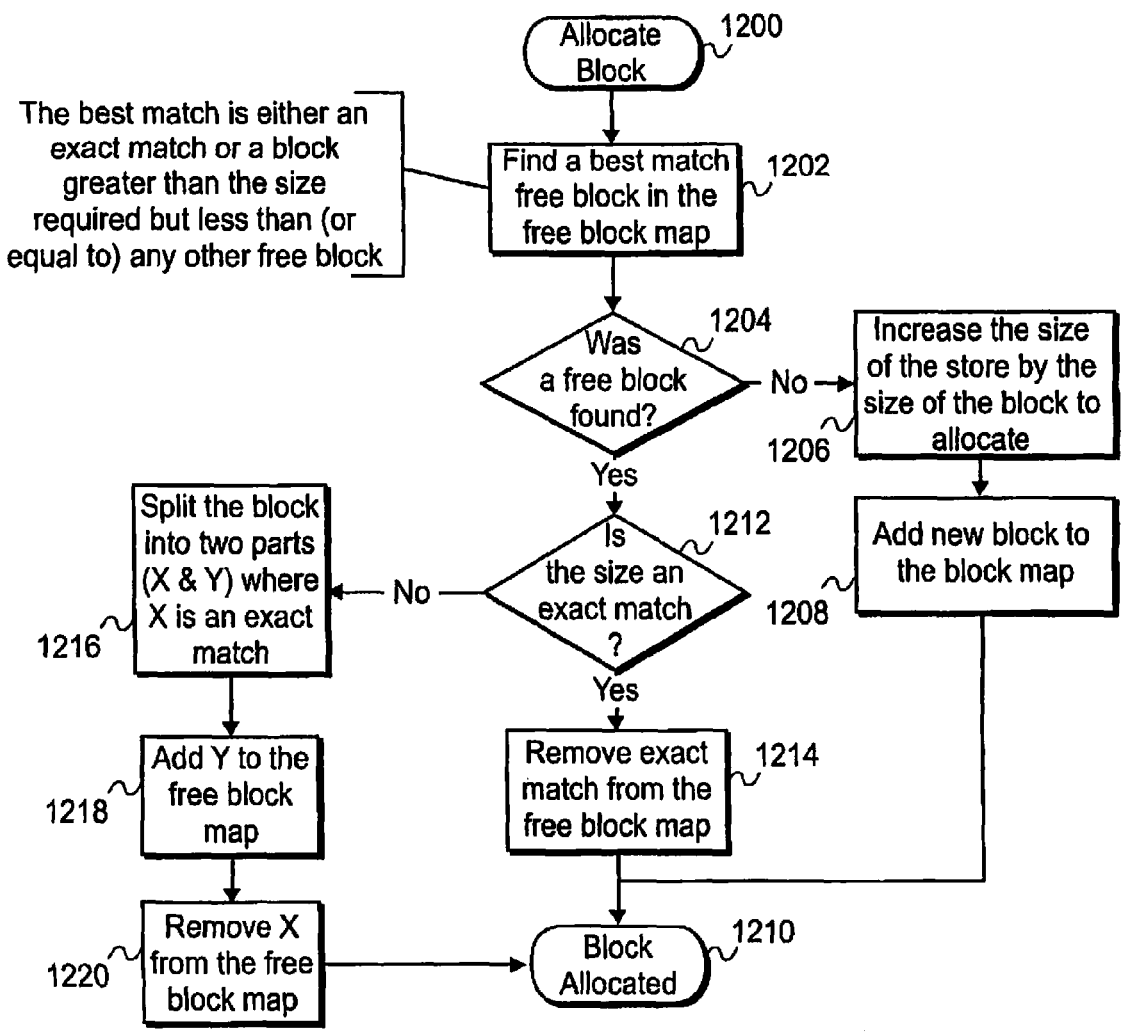
Figure 13:
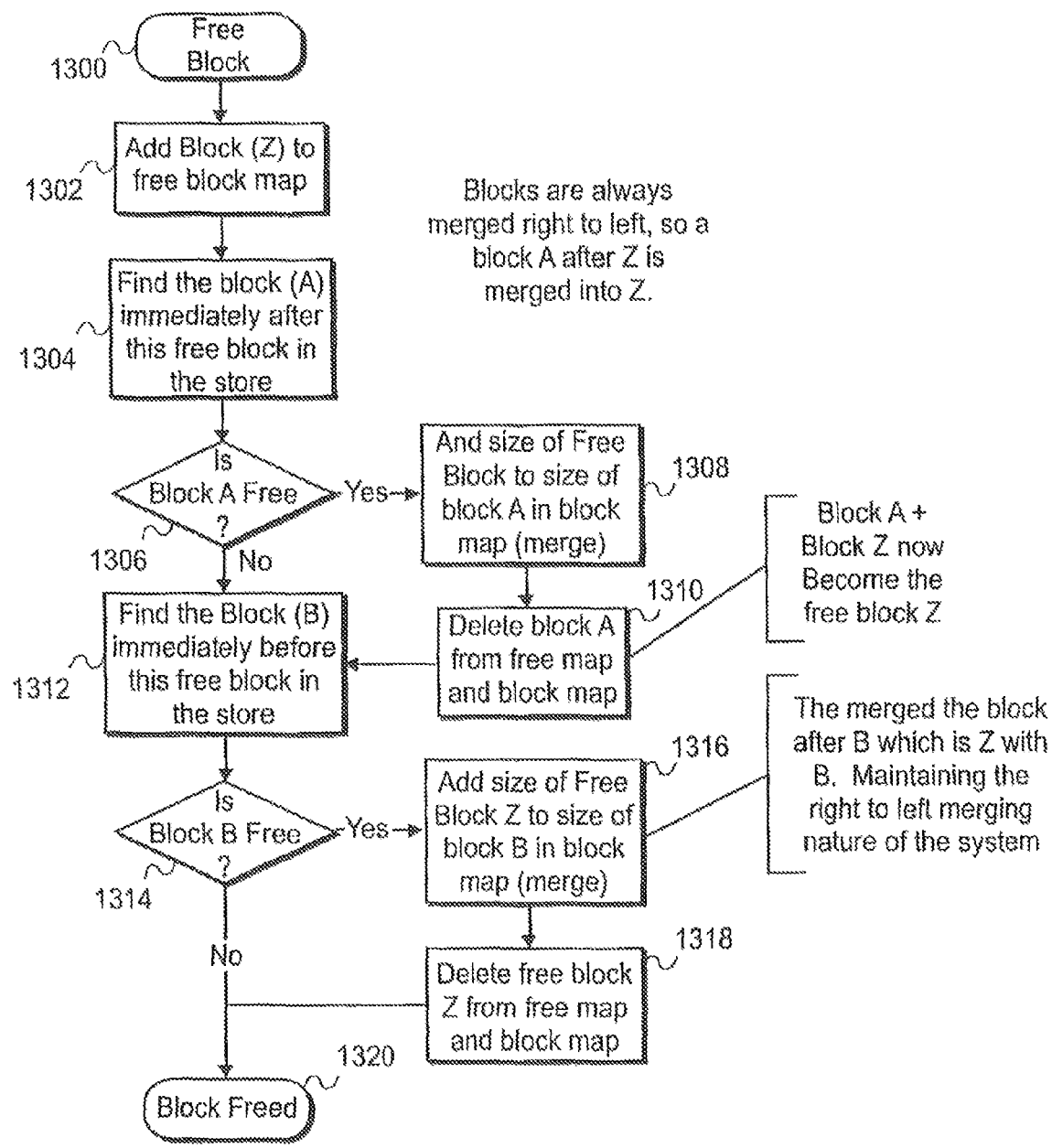

FIG. 12 shows the sub-routine of step 1018 for allocating blocks for the management data and the sub-routine of step 1004 for allocating blocks for the process data and commences at step 1200 when the control unit 26 issues an instruction to allocate a block. The control unit 26 proceeds to step 1202 and searches for a free block in the block map 322 that forms the best match with the data to be written. In this instance, a best match signifies either that the block is an exact match in size for the data, or that the block is greater than the size required but less than or equal to any other free block in the free block map 326. The control unit 26 then proceeds to step 1204 and enquires whether a suitable free block was found. If the answer is no, the control unit 26 proceeds to step 1206 and increases the size of the store 22 by an amount necessary for the block that is to be allocated, following which the control unit 26 adds the newly created block to the block map 322 in step 1208. The control unit 26 then proceeds to step 1210. On the other hand, if the answer to the enquiry in step 1204 is yes, the control unit 26 proceeds to step 1212 and enquires whether the free block is an exact match in size. If the answer is yes, the control unit 26 removes the block from the free block map 324 in step 1214 and proceeds to step 1210. If the answer to the query in step 1212 is no, the control unit 26 splits the newly found block into two parts such that one part, block X, is an exact match in size with the relevant data, in step 1216. In step 1218 the control unit 26 adds the other block, block Y, to the free block map 324 and proceeds to step 1220 where the first block X is removed from the free block map 324. The sub-routine is completed in step 1210, in which an indication that the block has been allocated The sub-routine of step 1028 for freeing an available block is illustrated in FIG. 13, and commences at step 1300 when the control unit 26 issues an instruction to free the relevant block Z. In step 1302, the control unit 26 adds this block Z to the free block map 324, and in step 1304 the control unit 26 finds the block immediately after this free block in the store 22 and designates this block as block A. In step 1306, the control unit 26 enquires whether block A is free, and if the answer is yes, merges block A with the free block Z by adding the size of block A to the size of the free block Z in step 1308. The control unit 26 proceeds to step 1310 and deletes the block A from the free block map 324 and from the block map 322, so that the new free block is now the merged block, designated Z'. The control unit 26 then proceeds to step 1312. If the answer to the enquiry in step 1310 is a no, the control unit 26 proceeds directly to step 1312. In step 1312, the control unit 26 searches for the block immediately before the original free block Z in the store, which is also the block immediately before the merged block Z', and designates this block B. The control unit 26 proceeds to step 1314 and enquires whether block B is free. If the answer is yes, the control unit 26 proceeds to step 1316 and adds the size of the free block Z' to the size of block B, creating a new merged block B'. The control unit 26 proceeds to step 1318 and deletes block Z' from the free block map 324 and the block map 322. The control unit 26 then proceeds to step 1320. If the answer to the enquiry in step 1314 is a no, the control unit 26 proceeds directly to step 1320, in which an indication that the block has been freed is issued.

Figure 14:
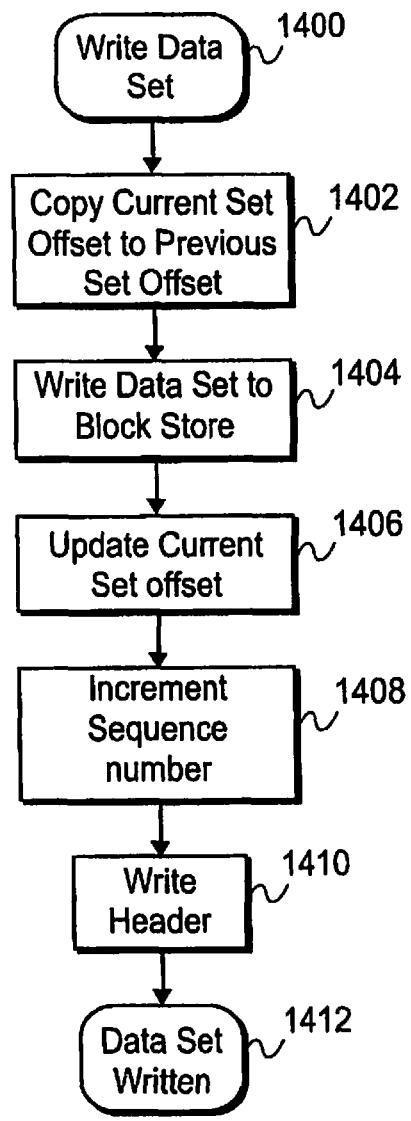

Turning now to FIG. 14, the sub-routine of step 1026 in FIG. 10 will be described. In this step, the set of management data is to be written from the cache 28 to the store 22 and the control unit 26 initiates this sub-routine with a write data set instruction in step 1400. The control unit 26 then proceeds to step 1402 and in the store 22 re-designates what has been the current management data set in the store 22 as the new previous management data set. The control unit 26 then writes the current management data set in the cache 28 to the store 22 as the new current management data set in step 1404. Following this, the control unit 26 updates offset details in the store 22 for the new current management data set in step 1406 and increments a count value by 1 in step 1408 to indicate that the present version of the current management data has been increased by one version. Finally, in step 1410, the control unit 26 updates the header 40 in the store 22 and issues a management data set written indication in step 1412.

The present invention provides a storage management system, which may be used with any type of store and which employs version based addresses with a fallback to a previous known state in the event of error detection, and which further employs a garbage collection policy by reclaiming storage locations that are no longer required in order to reduce the size of the store. Thus, at any one time the store contains two versions of any particular set of data, either the management data or the process data (with the proviso that if in practice the two sets of process data would be the same the system only retains one such set), and an error detection arrangement permits reversion to the previous data set in the event that a checksum value indicates that an error has occurred.

The present invention, as described, provides an efficient and secure process for accessing and managing data in a single store 22 from a respective one of a plurality of different processes 20. The advantage of the present invention is that each process 20 manages it own access to the store 22 whilst at the same time being prevented from interfering with the access of another process 20 to the store 22, and yet there is no need for an additional store manager process. Individual processes 20 therefore monitor their own data management and data integrity, and the control for this can be included in the package on sale. Consequently, the process 20 can be implemented in a network whether or not the store manager process already exists and without the need for the separate purchasing of the store manager process if there is not already one in existence.

The invention claimed is:

1. A storage management system, comprising:
   a shared store, accessible by each of a plurality of parties, that stores management data indicating the storage allocations of the shared store;
   a plurality of parties, each party having access to said shared store and each party comprising:
   a data processor;
   a cache that stores data generated by the data processor and the management data indicating storage allocations of the shared store; and
   a control unit that manages a first data transfer between the cache and the shared store, wherein said control unit operates independently without interfering with the access of another party to said shared store and wherein the control unit separates the data into data blocks for transfer to the shared store, the control unit being embedded in each party of said plurality of parties in a shared access network and comprising:
     a manager that identifies one or more available storage locations to receive and store the data in the shared store and allocates the data to the one or more available storage locations to render allocated data, wherein allocating to the one or more available storage locations comprises determining the size of the data blocks and allocating the data blocks to a selected address and offset in the shared store;
     an interface that manages a second data transfer of the allocated data to the one or more available storage locations; and
     a locking mechanism that generates a lock and locks the shared store during the first data transfer and the second data transfer to ensure that each party obtains exclusive access by preventing access from other parties of the plurality of the parties and that data integrity is preserved.

2. The system according to claim 1, wherein the control unit further comprises a data verifier that detects the corruption of data.

3. The system according to claim 2, wherein the manager is arranged to co-operate with the data verifier to cancel corrupted data.

4. The system according to claim 1, wherein the control unit comprises a data verifier that checks for data corruption and in which the manager is responsive to the data verifier to cancel corrupted data.

5. The system according to claim 1, wherein the control unit further comprises a data encoder for encrypting data.

6. The system according to claim 1, wherein the control unit comprises at least one map representing storage locations within the shared store.

7. The system according to claim 6, wherein the at least one map includes a block map representing storage blocks in the shared store and an address map representing addresses for the storage blocks which have already been allocated.

8. The system according to claim 6 further comprising at least one list representing storage locations in the shared store which are currently available.

9. The system according to claim 8, wherein the at least one list comprises a free locked list representing blocks in the shared store which have previously been allocated and are no longer needed but which are locked and cannot be overwritten.

10. The system according to claim 8, wherein the at least one list comprises a free offset list representing blocks in the shared store which have not yet been allocated, and a free address list representing addresses for blocks in the shared store which have previously been allocated and are now free for re-use.

11. The system according to claim 1, wherein the control unit employs a garbage collection policy.

12. A shared access network comprising:
   a plurality of parties,
   a shared store, accessible by said plurality of parties, that stores management data indicating the storage allocations of the shared store, and
   each of said parties comprising a storage management system, the storage management system comprising:
   a data processor;
   a cache that stores data generated by the data processor and the management data indicating storage allocations of the shared store; and
   a control unit that manages a first data transfer between the cache and a shared store, wherein said control unit operates independently without interfering with the access of another party to said shared store and wherein the control unit separates the data into data blocks for transfer to the shared store, the control unit being embedded in each party of said plurality of parties in the shared access network and comprising:
     a manager that identifies one or more available storage locations to receive and store data in the shared store and allocates the data to one or more available storage locations to render allocated data, wherein allocating to the one or more available storage locations comprises determining the size of the data blocks and allocating the data blocks to a selected address and offset in the shared store;

an interface that manages a second data transfer of the allocated data to the one or more available storage locations; and a locking mechanism that generates a lock and locks the shared store during the first data transfer and the second data transfer in order to ensure that each party obtains exclusive access by preventing access from other parties of the plurality of the parties and that data integrity is preserved.

13. The network according to claim 12, wherein the control unit further comprises a data verifier that detects the corruption of data.

14. The network according to claim 13, wherein the manager is arranged to co-operate with the data verifier to cancel corrupted data.

15. The network according to claim 12, wherein the control unit comprises a data verifier that checks for data corruption and in which the manager is responsive to the data verifier to cancel corrupted data.

16. The network according to claim 12, wherein the control unit further comprises a data encoder for encrypting data.

17. The network according to claim 12, wherein the control unit comprises at least one map representing storage locations within the shared store.

18. The network according to claim 17, wherein the at least one map includes a block map representing storage blocks in the shared store and an address map representing addresses for the storage blocks which have already been allocated.

19. The network according to claim 17 further comprising at least one list representing storage locations in the shared store which are currently available.

20. The network according to claim 19, wherein the at least one list comprises a free locked list representing blocks in the shared store which have previously been allocated and are no longer needed but which are currently locked and cannot be overwritten.

21. The network according to claim 19, wherein the at least one list comprises a free offset list representing blocks in the shared store which have not yet been allocated, and a free address list representing addresses for blocks in the shared store which have been previously allocated and are now free for re-use.

22. The network according to claim 12, wherein the control unit employs a garbage collection policy.

23. A method of storage management comprising:

generating data with a data processor in each party of a plurality of parties in a shared access network, each party of a plurality of parties having an embedded control unit, wherein said control unit operates independently without interfering with the access of another party to a shared store;

storing in a shared store, accessible by each of said parties, management data indicating the storage allocations of the shared store;

said control unit of each party configured for:
    storing in a cache the data generated by the data processor and the management data indicating the current storage allocations of the shared store;
    managing a first data transfer between the cache and the shared store;
    monitoring the availability of storage locations in the shared store to receive and store the data;
    allocating the data to one or more available storage locations to render allocated data, said allocating comprising separating the data into data blocks for transfer to the shared store, determining the size of the data blocks, and allocating the data blocks to a selected address and offset in the shared store;
    managing a second data transfer of the allocated data and to one or more available storage locations; and
    locking the shared store with a lock generated by the control unit of the party during the first data transfer and the second data transfer in order to ensure that each party obtains exclusive access by preventing access from other parties of the plurality of the parties and that data integrity is preserved.

24. The method according to claim 23, further comprising detecting the corruption of the data.

25. The method according to claim 24 further comprising cancelling corrupted data.

26. The method according to claim 24 further comprising checking for data corruption and in the event of data corruption cancelling the corrupted data.

27. The method according to claim 23 further comprising encrypting data to be stored.

28. The method according to claim 23 further comprising employing a garbage collection policy for reducing the size of the shared store.

* * * * *